(12) United States Patent
Ettinger, Jr. et al.

(10) Patent No.: US 6,259,110 B1
(45) Date of Patent: Jul. 10, 2001

(54) APPARATUS AND METHOD FOR ALIGNING A HORIZONTAL METAL EXTRUSION PRESS

(75) Inventors: Raymond L. Ettinger, Jr., Dimondale; James H. Pierce, Commerce Township, both of MI (US)

(73) Assignee: Intra Corporation, Westland, MI (US)

( * ) Notice: Subject to any disclaimer, the term of this patent is extended or adjusted under 35 U.S.C. 154(b) by 0 days.

(21) Appl. No.: 09/342,985

(22) Filed: Jun. 29, 1999

(51) Int. Cl.[7] .............................. G01V 8/00; G01C 15/00
(52) U.S. Cl. .................... 250/559.3; 356/400; 33/286; 33/DIG. 21
(58) Field of Search ..................... 250/559.29, 559.3, 250/202, 203.1; 356/151, 152.1, 141.3, 399, 400; 33/286, DIG. 21, 290, 293, 533, 645, 655

(56) References Cited

U.S. PATENT DOCUMENTS

| | | | |
|---|---|---|---|
| 5,353,111 | * 10/1994 | Freese et al. | 250/214 B |
| 5,421,181 | * 6/1995 | Ahrweiler et al. | 72/31.13 |
| 5,507,097 | * 4/1996 | Duey et al. | 33/286 |
| 5,856,875 | * 1/1999 | Duey et al. | 356/400 |

\* cited by examiner

Primary Examiner—John R. Lee
Assistant Examiner—Kevin Pyo
(74) Attorney, Agent, or Firm—Alex Rhodes (57) ABSTRACT

A laser apparatus and method for aligning a horizontal metal extrusion press. The apparatus comprises a scanning laser and scanning laser target, one or more spindle lasers and spindle laser targets, a data acquisition station and adapters for mounting the lasers and targets. The method comprises the steps of leveling and aligning the components of the horizontal extrusion press in parallel, square and aligned relationship with respect to each other. Alignments are preferably performed with the extrusion press at its operating temperature. The selections as to which press members are used for locating the lasers and targets are necessary requirements for proper alignment of the press members.

16 Claims, 9 Drawing Sheets

APPARATUS AND METHOD FOR ALIGNING A HORIZONTAL METAL EXTRUSION PRESS

FIELD OF THE INVENTION

This invention relates to machine alignment and more particularly to an apparatus and method for inspecting and aligning horizontal metal extrusion presses.

BACKGROUND OF THE INVENTION

Horizontal extrusion presses are used for forming relatively long bar and tubular metal products, such as angles, "I" beams and channels. Horizontal presses are preferred in order to simplify removal of the bars and tubes which are susceptible to bending.

The horizontal extrusion press members include spaced apart fixed front and rear platens which are connected by long slender tie bars. Rams are slidably mounted in the rear platens and extrude metal ingots through dies which are mounted in the front platens. The metal ingots (generally aluminum alloys) are heated in furnaces to high temperatures and extruded under high forces through dies.

Alignments and inspections of extrusion presses are difficult because of the temperatures, forces, span between platens, and long slender tie rods. Current procedures utilize squares, levels, dial indicators, optical telescopes, inside micrometers and long wires.

There are a number of drawbacks with current procedures. One drawback is that data plots are unavailable for evaluating the twist, bend and flatness of rails and formulating the proper steps for correcting misalignments. Another drawback is that the current procedures require the extensive use of skilled personnel. Another drawback is that current procedures often fail to correct tracking and misalignment errors of rams with respect to furnaces and extrusion dies. Ram tracking and misalignment errors accelerate machine wear and die wear. Machine wear and die wear are undesirable because they cause frequent production losses, high maintenance costs and poor part quality.

SUMMARY OF THE INVENTION

All of the drawbacks and difficulties encountered with prior alignment and servicing practices are completely overcome with the present invention. The drawbacks and difficulties are overcome by replacing the squares, levels, dial indicators, optical telescopes, micrometers and long wires with an accurate laser apparatus and method. The laser apparatus and method allow multiple measurements to be efficiently taken for analyzing alignment problems and formulating the proper steps for correcting misalignments.

The laser apparatus is comprised of one or more spindle lasers, a scanning laser, photocell targets, a data acquisition apparatus and adaptors for mounting the spindle lasers, scanning lasers and targets. The method and apparatus collectively contribute to the invention's ability to improve the alignments of horizontal metal extrusion presses.

One advantage of the invention is that the times and levels of skill for aligning and servicing horizontal metal extrusion presses are substantially reduced. Another advantage is that the invention can be used by manufacturers, re-builders and maintenance personnel.

In employing the teaching of the present invention, a plurality of alternate constructions can be adopted to achieve the desired results and capabilities. In this disclosure, only one preferred embodiment is discussed. However, this embodiment is intended as an example and should not be considered as limiting the scope of the invention.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

DETAILED DESCRIPTION OF THE PREFERRED EMBODIMENT

Figures 1, 2:
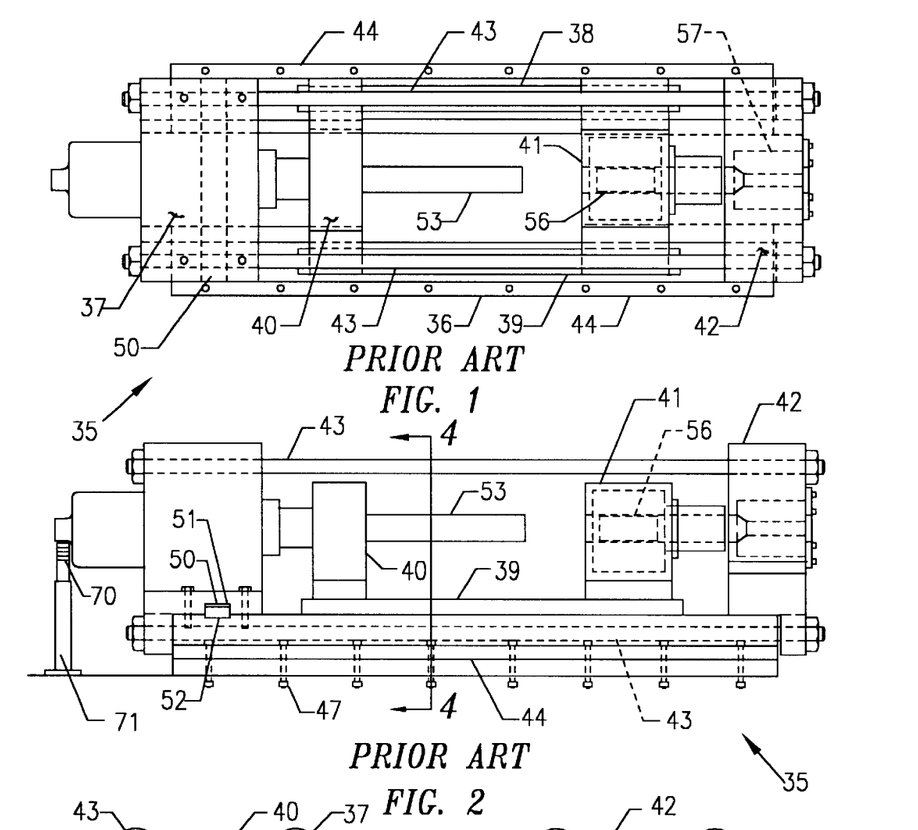
FIG. 1 is a diagrammatic plan view of a typical horizontal metal extrusion press.
FIG. 2 is a right side view of the extrusion press.
Figure 3:
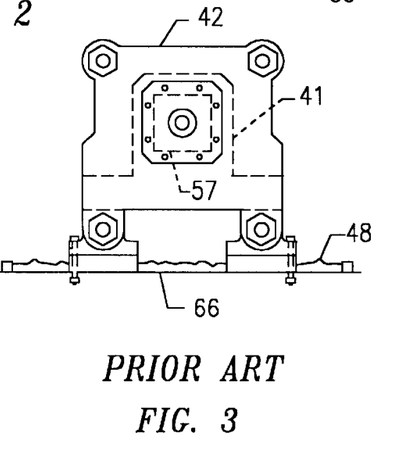
FIG. 3 is a front view of the extrusion press.

Referring now to the drawings wherein like numerals designate like and corresponding parts throughout the several views, in FIGS. 1 through 3, inclusive, a horizontal metal extrusion press 35 is diagrammatically shown for purposes of describing our invention. Although actual extrusion presses may vary somewhat with regard to specific design features of the drawings, they generally consist of a frame 36, a fixed rear bottle platen 37, a pair of horizontal skid rails 38, 39, a crosshead 40, a furnace 41, a front platen 42 and tie rods 43.

The frame 36 is comprised of a pair of spaced apart horizontal rails 44, each having a box upper portion 45 and a flange lower portion 46. The frame rails 44 are restrained to a floor by anchor bolts 47 and a border of grout 48 which surrounds the frame rails 44. Below the frame rails 44 at the anchor bolts 47 are shims 49 for leveling the frame rails 44.

The rear bottle platen 37, skid rails 38, 39 and front platen 42 rest on the frame rails 44. The bottle platen 37 is bolted to the frame rails 44 and is positioned on the frame rails 44 by a transverse key 50 which engages keyways 51, 52 of the rear bottle platen 37 and frame rails 44. The key 50 positions the bottle platen 37 in square relationship with the frame rails 44. Inside of the bottle platen 37 is a drive mechanism (not shown) for advancing and retracting the crosshead 40 and a ram 53 in a longitudinal direction. The front platen 42 is not attached to the frame rails 44 and is free to move along the frame rails 44 during the operation of the press 35.

Figure 4:
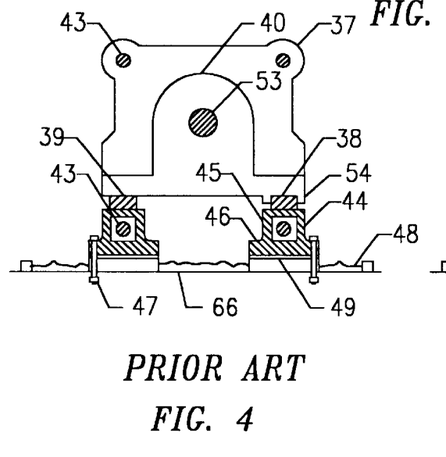
FIG. 4 is a cross-sectional view taken on the line 4—4 in FIG. 2.

Referring to FIG. 4, lower portions 54 of one side of the crosshead 40 overlap a master skid rail 38 to laterally position the center of the crosshead 40 on the longitudinal center of the press 35. During longitudinal movements of the crosshead 40 on the skid rails 38, 39, the contact between the crosshead 40 and the sides of the master skid rail 38 is maintained.

The opposite skid rail is a slave rail 39 which supports the opposite side of the crosshead 40. The master skid rail 38 and slave skid rail 39 are bolted to the frame rails 44 with threaded fasteners that extend through the skid rails 38, 39 and engage the frame rails 44.

The furnace 41 is fixedly mounted on the skid rails 38, 39, ahead of the crosshead 40. One lower side portion 55 of the furnace 41 overlaps the master skid rail 39 to position the center of the furnace 41 on the center of the press 35. Threaded fasteners which engage the skid rails 38, 39 prevent the furnace 41 from moving on the skid rails 38, 39. A metal ingot 56, most commonly an aluminum ingot, is softened in the furnace 41 and extruded by the ram 53 through a die 57 which is mounted in the front platen 42.

The die 57 is slidably mounted in the front platen 42 and is removable from the front platen 42. The front platen 42 is supported by the frame rails 44 and is connected to the rear bottle platen 37 by the four tie rods 43. During an extrusion of the ingot 56 through the die 57, the tie rods 43 elongate because they are subjected to high forces.

The alignment apparatus is comprised of at least one spindle laser, a scanning laser, photocell targets, a data acquisition station and adapters for mounting the lasers and targets. A spindle laser projects a narrow collimated laser beam to a photocell target which generates signals when struck by the laser beam. The data acquisition station converts the signals of the target into a readable numeric form.

Apparatus which are suitable for use with the present invention are manufactured and marketed by the Intra Corporation of Westland, Mich. The use of these devices is fully disclosed in U.S. Pat. Nos. 5,353,111; 5,507,097; and 5,856,875 which are incorporated herein by reference. The Intra spindle laser and photocell target are supplied with cylindrical mounting posts for mounting the spindle laser and target in tooling holes and adapters. The Intra spindle laser projects a narrow collimated beam which is visible for rough aligning the spindle laser with the photocell target. The Intra data acquisition station is resistant to ambient noise from industrial lighting systems.

One feature which is recommended for use with the present invention is the "pull back" feature of U.S. Pat. Nos. 5,507,097; and 5,856,875 for mounting a spindle laser and photocell target in an adapter. Suitable scanning lasers and targets are available and well known in the art.

Two types of alignment are contemplated with the present invention, i.e. an alignment by a manufacturer and an alignment by a machine re-builder or repair man.

An alignment of an extrusion press member is essentially a two step process. The initial step is to inspect the member's alignment. If the results are unsatisfactory, the member is re-positioned by moving the member with or without the use of shims. In some cases, the member may have to be replaced or re-machined.

Qualified surfaces and tooling holes are provided by manufacturers as to position, flatness, squareness and surface finish for assembling members and mounting alignment devices. By way of example, apertures are provided in the frame rails 44 for dowels which locate the skid rails 38, 39. By way of further example, the front surface of the bottle platen 37, rear surface of the front platen 42 and surfaces of the frame rails 44 and skid rails 38, 39 are qualified to be flat, square and parallel. Thus, in the ensuing description, it will be understood that the lasers 58, targets 60, 61 and adapters 63, 64 are mounted on surfaces or in tooling holes which have been qualified as to location, flatness and surface finish.

When an alignment is performed by a machine re-builder, existing qualified surfaces and tooling holes are utilized. In some cases, when needed, new qualified surfaces or tooling holes are provided by the re-builder for mounting the lasers 58, photocell targets 60, 61 and adapters 63, 64. The locating surfaces are qualified by the re-builder with respect to their positions, tolerances and surface finishes. In most cases, at least some disassembly of an extrusion press will be required.

The procedures for aligning the members of a horizontal metal extrusion press are the following. For each of the procedures it is important to note on which members the spindle laser 58 is mounted and on which members the targets 60, 61 are mounted. In all cases, the scanning laser 59 is mounted on a tripod 65 which rests on a floor.

Figure 5:
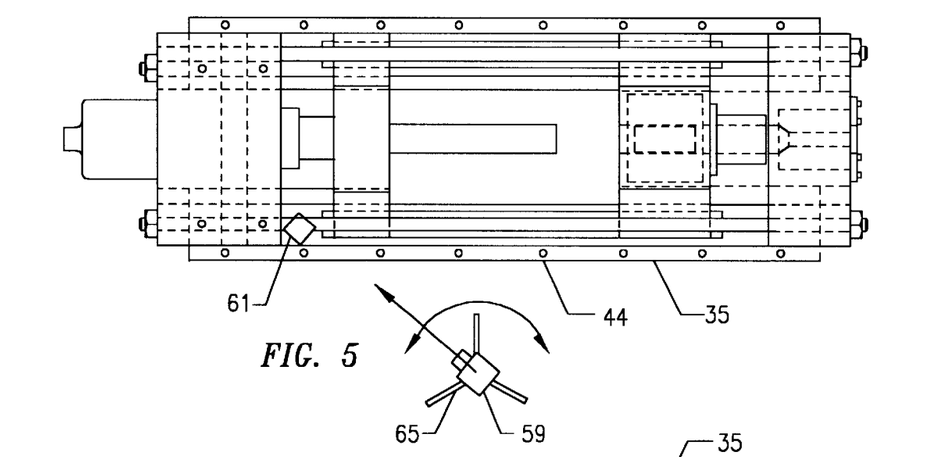
FIG. 5 is a plan view showing the step of leveling a frame of the extrusion press.
Figures 6, 7, 8:
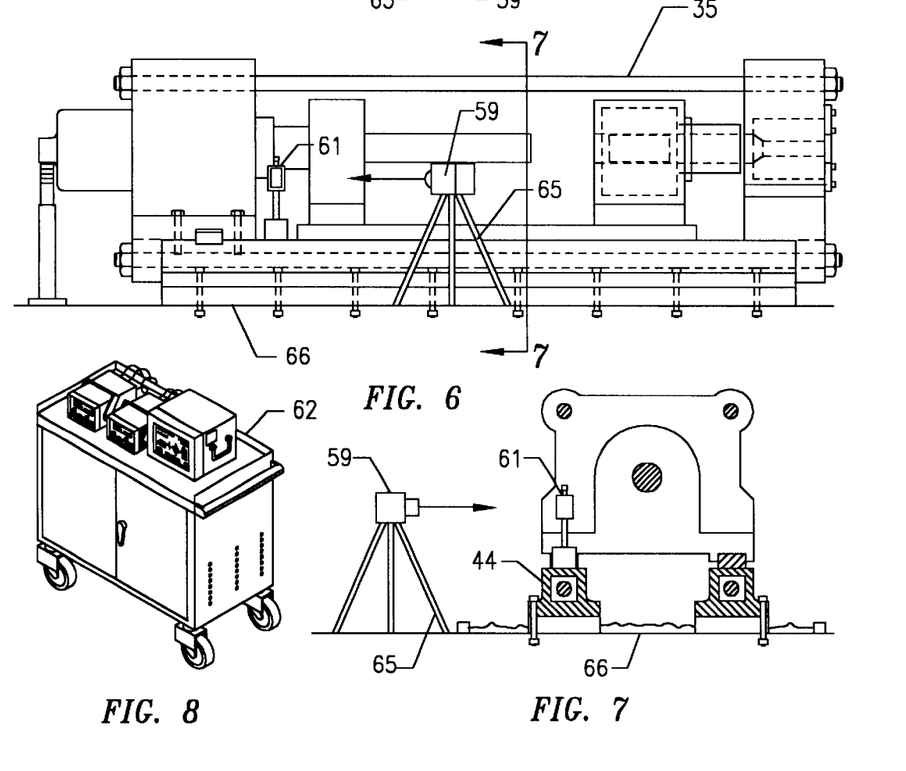
FIG. 6 is right side view of FIG. 5.
FIG. 7 is a cross-sectional view taken on the line 7—7 in FIG. 6.
FIG. 8 is a perspective view of a data acquisition station.

The alignments are performed with the furnace 41 preferably operating at its normal operating temperature. Referring to FIGS. 5 through 7, to level the frame 36, the scanning target 61 is placed on the frame rails 44 and the scanning laser 59, mounted on the tripod 65, is placed on a reference frame, i.e., the floor 66.

With the position of the scanning laser 59 fixed, the scanning laser target 61 is moved to various locations on the frame rails 44. At each location, the scanning laser 59 is swept through an angle and signals are transmitted to the data acquisition station 62 of FIG. 8. The signals are processed at the data acquisition station 62, displayed in a readable numeric or graphical form, and used for adding and subtracting shims 49 under the frame rails 44 to establish a level plane passing through the top surfaces of the frame rails 44.

Figure 9:
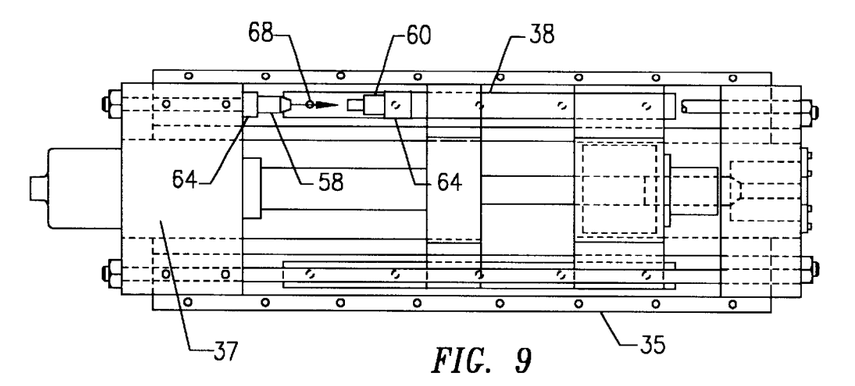
FIG. 9 is a plan view showing the step of squaring a master skid rail to a rear bottle platen of the extrusion press.
Figure 10:
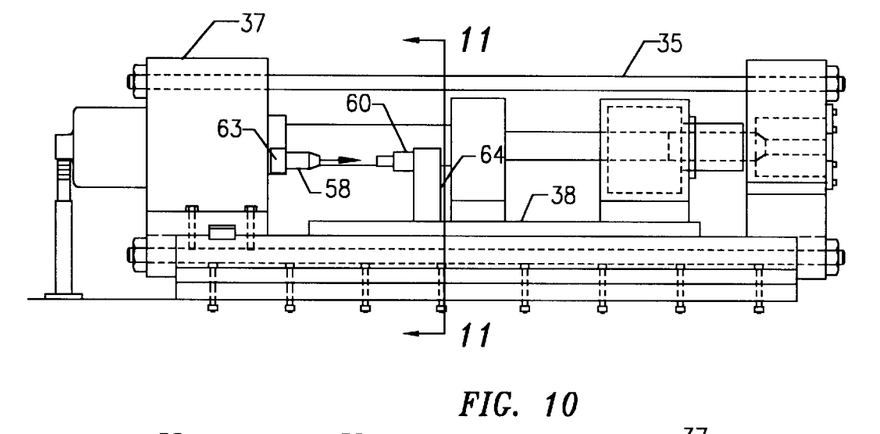
FIG. 10 is a right side view of FIG. 9.
Figures 11, 12:
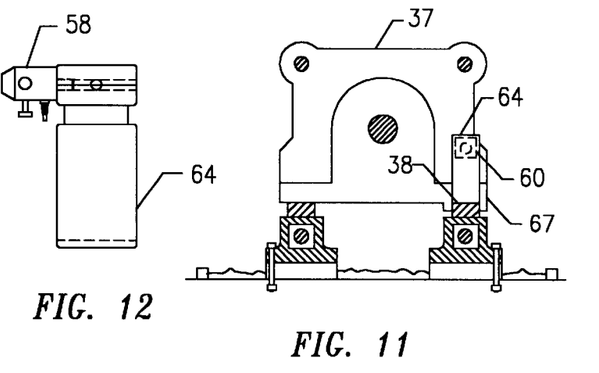
FIG. 11 is a cross-sectional view taken on the line 11—11 in FIG. 10.
FIG. 12 is an enlarged side view of a spindle laser mounted in a pedestal adapter.
Figure 13:
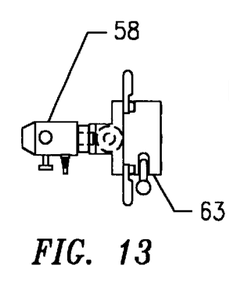
FIG. 13 is an enlarged side view of the spindle laser mounted in a magnetic adapter.

After the frame rails 44 have been leveled, the master skid rail 38 can be positioned in square relationship with the rear bottle platen 37. This step is illustrated in FIGS. 9 through 11, inclusive. The spindle laser 58 is mounted in an adapter, such as the magnetic adapter 63 of FIG. 13 and positioned on a qualified front surface of the bottle platen 37, in facing relationship to the photocell target 60 on the master skid rail 38. The photocell target 60, mounted in the pedestal adapter 64 of FIG. 12, is placed on the master skid rail 38 with an edge guide plate 67 in contact with the side surface of the master skid rail 38. The edge guide plate 67 is used to longitudinally align the adapter 64 with the master skid rail 38.

The master skid rail 38 is brought into square relationship with the bottle platen 37 using the data sent by the target 60 to the data acquisition station 62 to rotate the master skid rail 38 about a dowel pin 68. The master skid rail 38 is permanently fastened to the frame 36 by tightening the threaded fasteners which extend through the master skid rail 38.

Figure 14:
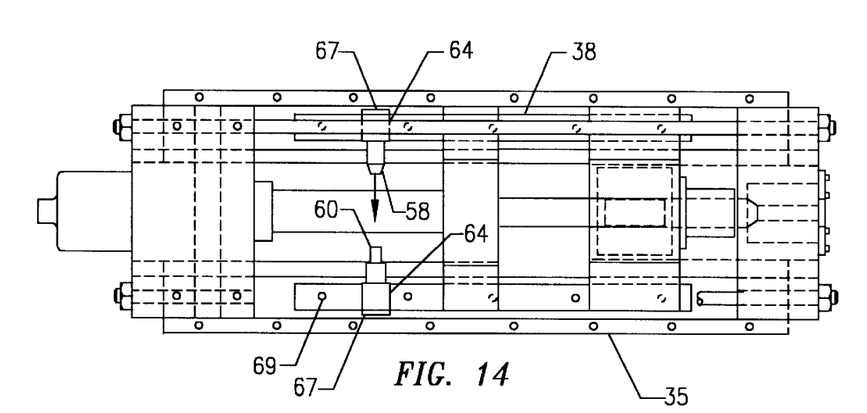
FIG. 14 is a plan view showing the step of aligning a slave skid rail with a master skid rail of the extrusion press.
Figure 15:
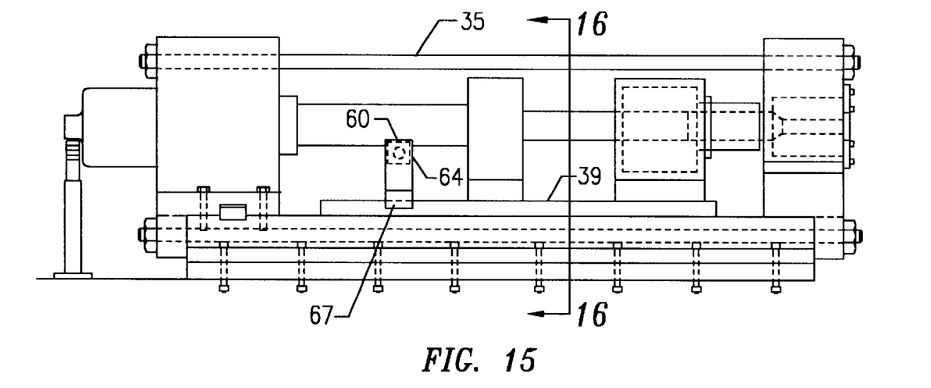
FIG. 15 is a right side view of FIG. 14.
Figure 16:
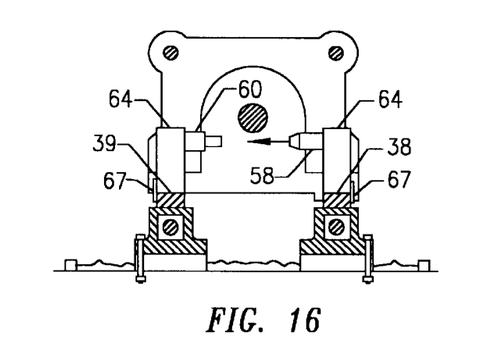
FIG. 16 is a cross-sectional view taken on the line 16—16 in FIG. 15.

After the master skid rail 38 has been squared with the bottle platen 37, the slave skid rail 39 can be aligned parallel with the master skid rail 38 using the setup shown in FIGS. 14 through 16, inclusive. The photocell target 60 is mounted in a pedestal adapter 64 which is positioned on the slave skid rail 39 with the edge guide plate 67 in contact with the side of the slave skid rail 39. The spindle laser 58 is mounted in a pedestal adapter 64 which is positioned on the master skid rail 38 in facing relationship with the photocell target 60 with an edge guide plate 67 in contact with the side of the master skid rail 38.

The slave skid rail 39 is brought into parallel relationship with the master skid rail 38 using the data sent by the target to the data acquisition station 62 to rotate the slave skid rail 39 about a dowel pin 69. The slave skid rail 39 is permanently fastened to the frame 36 by tightening the threaded fasteners which extend through the slave skid rail 39.

Figure 17:
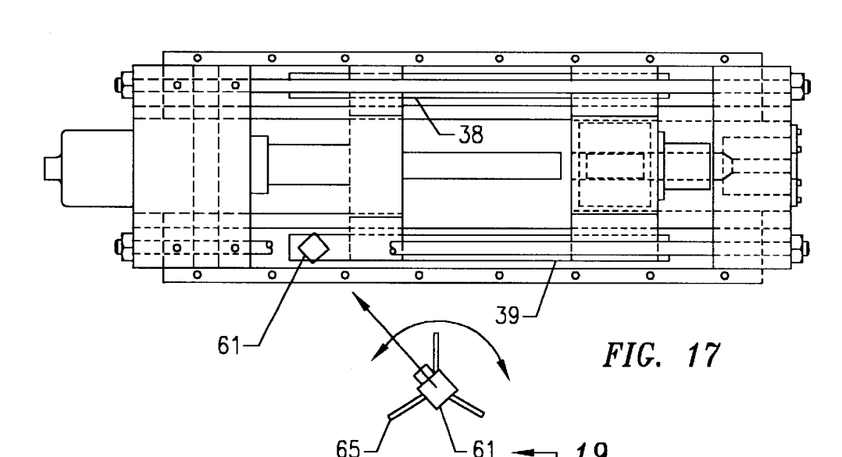
FIG. 17 is a plan view showing the step of inspecting the flatness, twist and bend of the master and slave skid rails.
Figures 18, 19:
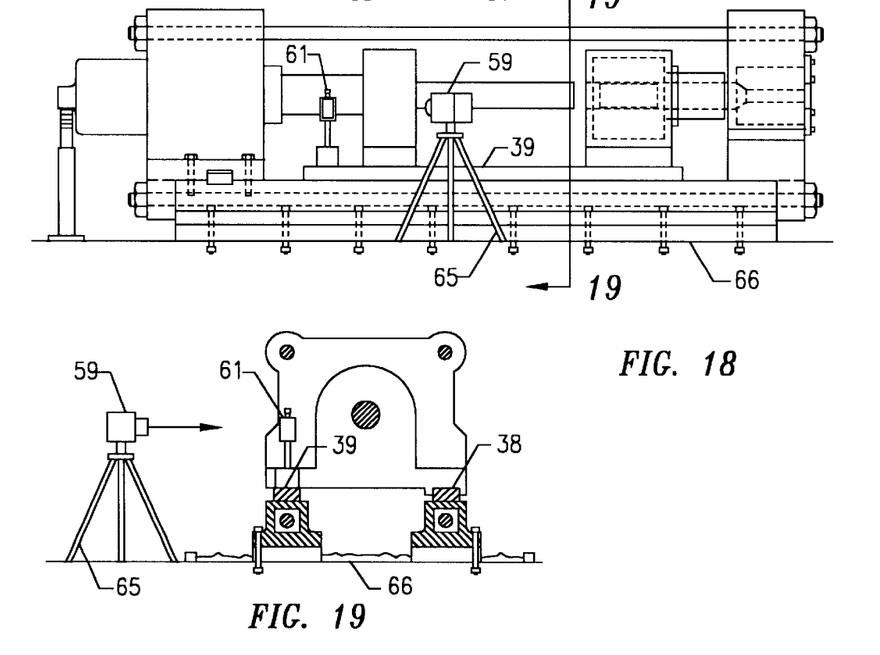
FIG. 18 is a right side view of FIG. 17.
FIG. 19 is a cross-sectional view taken on the line 19—19 in FIG. 18.

In FIGS. 17 through 19, inclusive, the setup is shown for inspecting the flatness, twist and bend of the master 38 and slave 39 skid rails. The scanning laser 59 is mounted on the tripod 65 at a fixed location of a reference frame such as the floor 66 and the scanning target 61 moved to various locations on the master 38 and slave 39 skid rails where target 61 readings are taken. If the data at the data acquisition station 62 exceeds the limits of the user, the frame 36 and skid rails 38, 39 are aligned as necessary.

Figure 20:
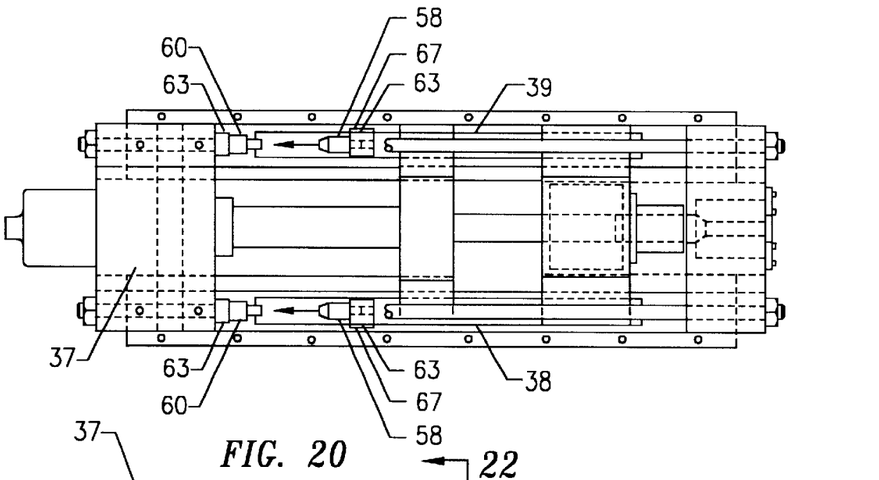
FIG. 20 is a plan view showing the step of vertically squaring the rear bottle platen with the master and slave skid rails, with and without loading the bottle platen.
Figure 21:
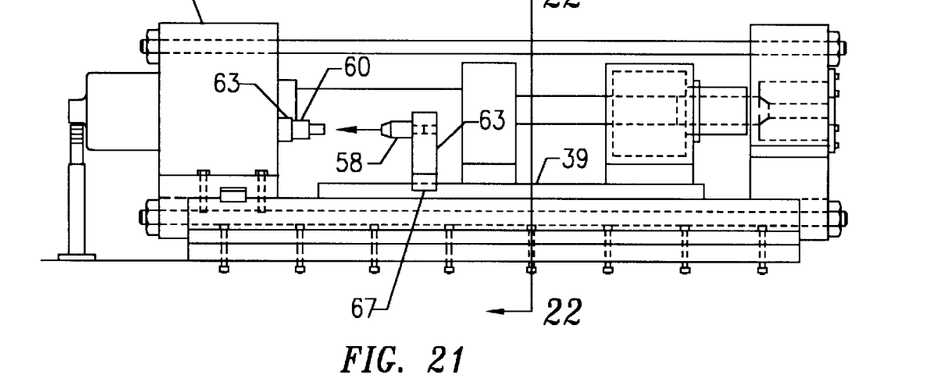
FIG. 21 is a right side view of FIG. 20.
Figure 22:
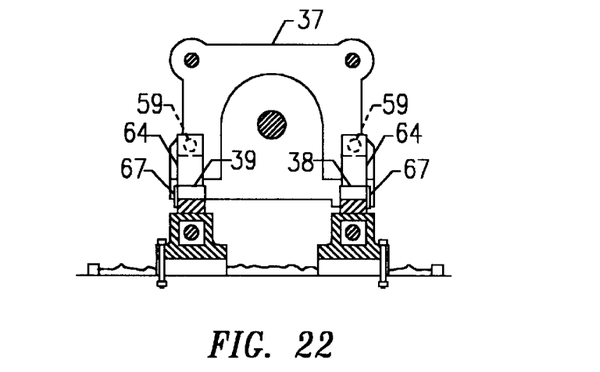
FIG. 22 is a cross-sectional view taken on the line 22—22 in FIG. 21.

The setup for establishing a square vertical relationship of the master skid rail 38 and slave skid rail 39 with the rear bottle platen 67 is shown in FIGS. 20 through 22, inclusive. A pair of spindle lasers 58 and photocell targets 60 are used for this procedure. The photocell targets 60 are mounted with magnetic adapters 63 on qualified front surfaces of the rear bottle platen 37 and the pair of spindle lasers 58 are mounted in facing relationship to the photocell targets 60 with pedestal adapters 64 on the master 38 and slave 39 skid rails.

The master 38 and slave 39 skid rails are squared with the bottle platen 37 by using the readings from the data acquisition station 62 to tilt the bottle platen 37 by adding or deleting shims 70 between the bottle platen 37 and a vertical support 71. This procedure is preferably performed with and without loading the extrusion press 35 by placing a dummy ingot in the furnace 41 and forcing the ram 53 against the ingot.

Figure 23:
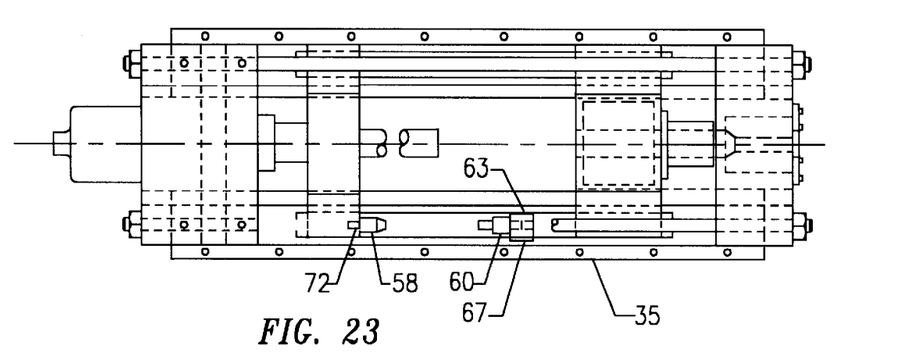
FIG. 23 is a plan view showing the step of aligning a crosshead center with the extrusion press center.
Figure 24:
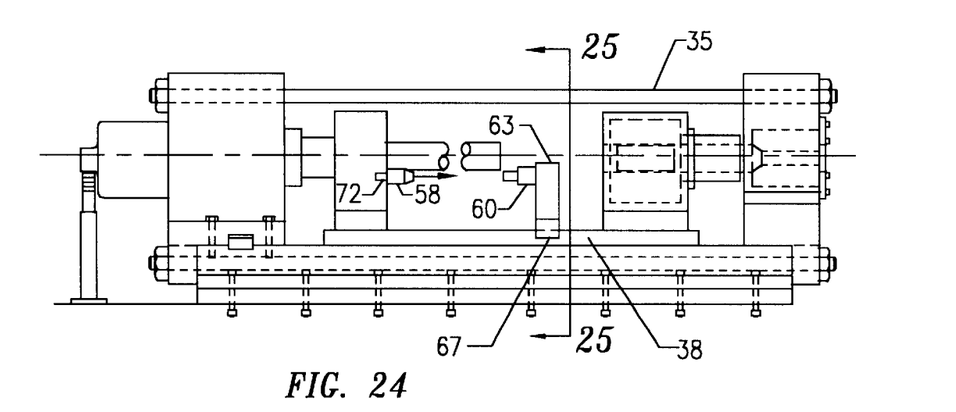
FIG. 24 is a right side view of FIG. 23.
Figure 25:
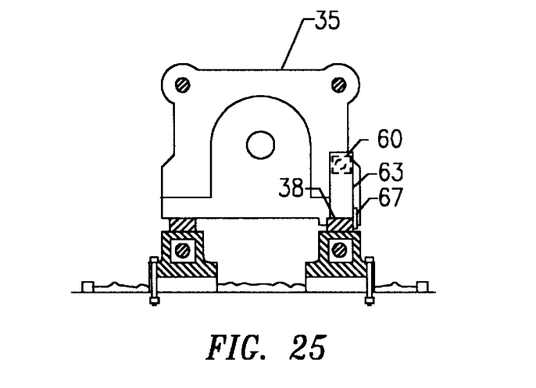
FIG. 25 is a cross-sectional view taken on the line 25—25 in FIG. 24.

In FIGS. 23 to 25, inclusive, the setup is shown for inspecting the alignment of the crosshead's center with the center of the extrusion press 35. The spindle laser 58 is mounted in the pedestal adapter 64 and is positioned on the master skid rail 38 with the edge plate 67 of the adapter 64 contacting the side surface of the master skid rail 38.

The target 60 is mounted in a tooling hole 72 in the front of the crosshead 40. The vertical and horizontal positions of the tooling hole 72 within close limits are known with respect to the press center. Data from the target 60 is processed in the data acquisition station 62 and used for aligning the center of the crosshead 40 with respect to the press center.

Figure 26:
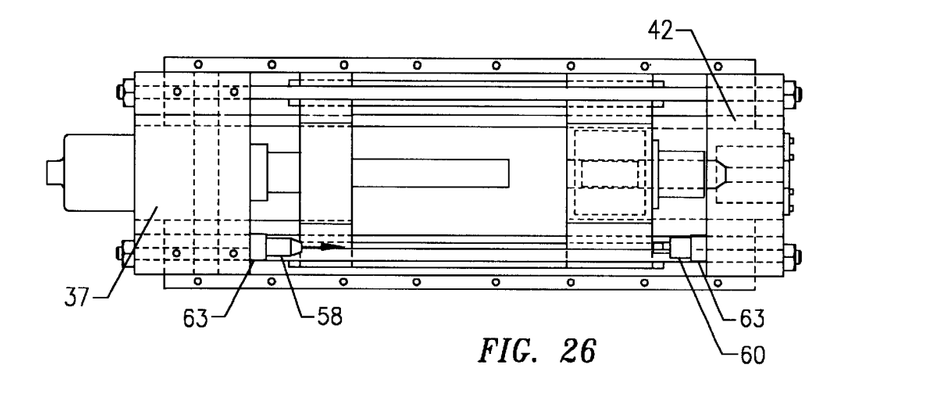
FIG. 26 is a plan view showing the step of aligning the front platen with the rear bottle platen.
Figure 27:
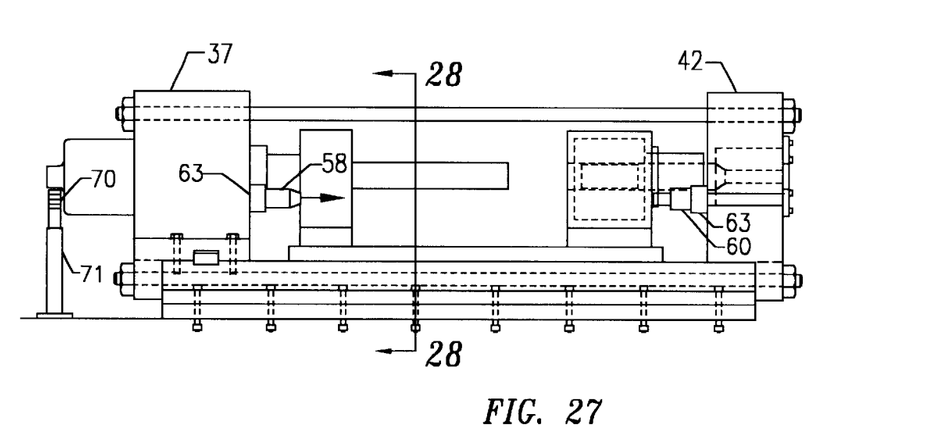
FIG. 27 is a right side view of FIG. 26.
Figure 28:
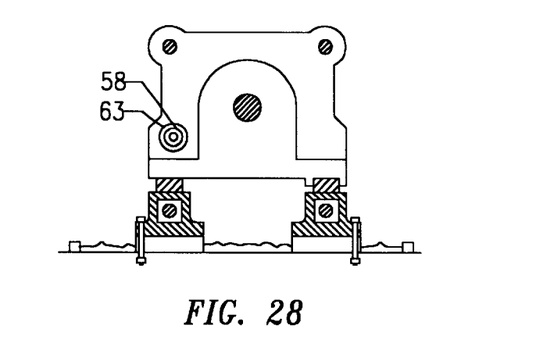
FIG. 28 is a cross-sectional view taken on the line 28—28 in FIG. 27.

Referring now to FIGS. 26 through 28, inclusive, the setup is shown for aligning the front platen 42 in parallel relationship with the rear bottle platen 37. The spindle laser 58, mounted in the magnetic adapter 63, is positioned on a qualified surface of the rear bottle platen 37 and the photocell target 60, mounted in the magnetic adapter 63, is mounted in facing relationship with the spindle laser 58 on a qualified surface of the front platen 42. Using the readings from the data acquisition station 62, the platens 37, 42 are aligned parallel by tilting the rear platen 37.

After the front 42 and rear 37 platens have been aligned parallel, the center of the crosshead 40 and the center of the extrusion press 35 are aligned, using the setup of FIGS. 23 through 25, inclusive. The spindle laser 58 is mounted in the tooling hole 72 of the crosshead 40 and the photocell target 60 is mounted in the pedestal adapter 64 and placed on one of the slave skid rails 39 with the edge guide plate 67 in contact with the side of the slave skid rail 39. If the data of the data acquisition station 62 exceeds the user's requirements, the crosshead 40 is modified to meet the user's requirements.

Figure 29:
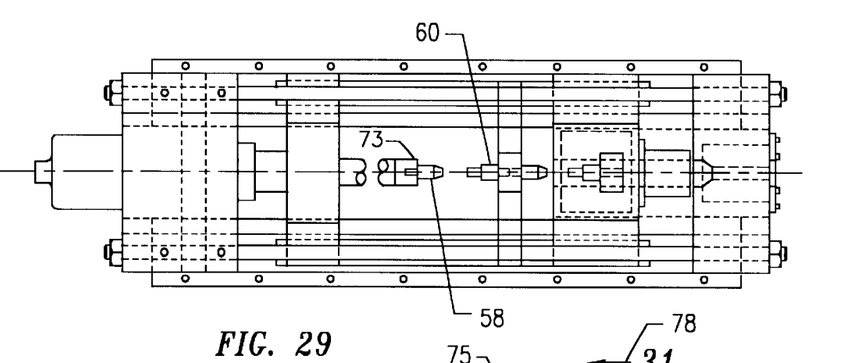
FIG. 29 is a plan view showing the step of aligning a furnace center with the extrusion press center.
Figure 30:
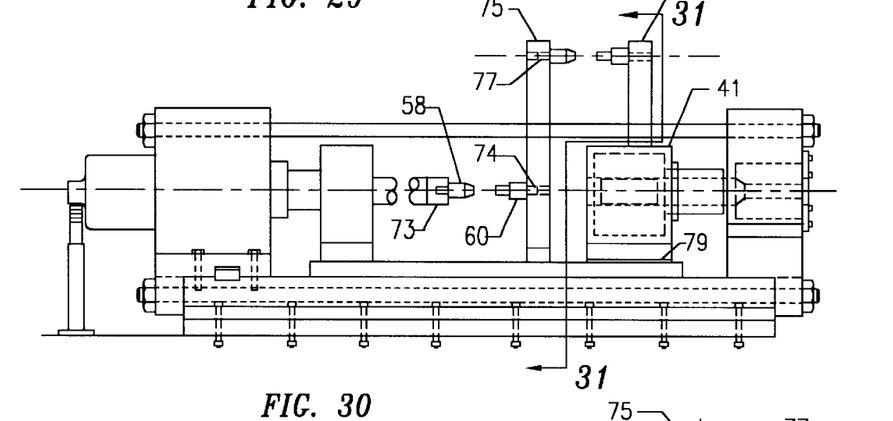
FIG. 30 is a right side view of FIG. 29.
Figure 31:
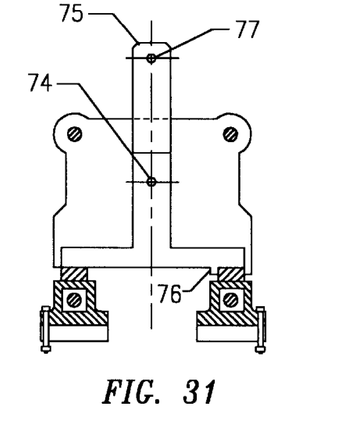
FIG. 31 is a cross-sectional view taken on the line 31—31 in FIG. 30.

The procedure for aligning the center of the furnace 41 with the center of the extrusion press 35 is shown in FIGS. 29 through 31, inclusive. A forward facing photocell target 60 is mounted in an adapter 73 which engages a threaded aperture at the end of the ram 53 and a rearward facing spindle laser 58 is mounted in a lower tooling hole 74 of an inverted "T" shaped adapter 75. The adapter 75 is located on the press 35 by a lower end portion 76 which overlaps the master skid rail 38.

A forward facing spindle laser 58 is mounted in an upper tooling hole 77 of the adapter 75 and a rearward facing photocell target 60 is mounted in a pedestal adapter 78 which is located on a top surface of the furnace 41. The center of the furnace 41 is aligned using the readings of the data acquisition station 62 to add and delete shims 79 at the base of the furnace 41.

Figure 32:
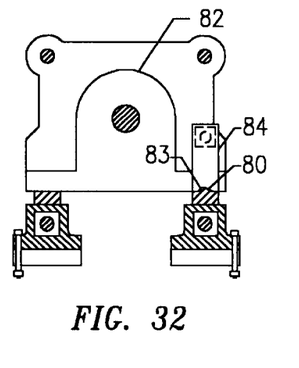
FIG. 32 is a cross-sectional view through an alternate construction of a horizontal metal extrusion press taken in the same manner as FIG. 4.
Figure 33:
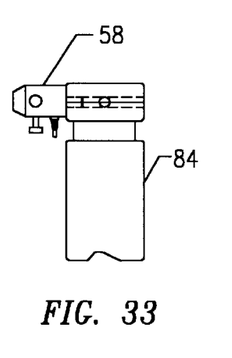
FIG. 33 is an enlarged side view of a spindle laser mounted in a pedestal adapter for use with press construction illustrated in FIG. 32.

FIG. 32 shows an alternate construction of the master skid rail 80 wherein a crosshead 82 and furnace (not shown) are located by a tapered guide portion 83 of the master skid rail 80. FIG. 33 shows a pedestal adapter 84 which is configured to engage the alternate rail construction 80.

From the foregoing it will be understood that our invention provides improvements in aligning horizontal metal extrusion presses heretofore unavailable.

Although a single embodiment has been disclosed, it will be appreciated that other embodiments can be derived by obvious changes in material, design, number and arrangement of parts without departing from the spirit thereof.

What we claim is new is:

1. An apparatus for aligning members of a horizontal metal extrusion press comprising: at least one spindle laser for projecting a narrow collimated laser beam toward a photocell target; a first photocell target for receiving said beam and generating signals which are indicative of an angle and position of said laser beam with respect to said target; a scanning laser for sweeping a laser beam along a horizontal plane; a second photocell target for receiving said scanning laser beam and generating signals which are indicative of the position of said target with respect to said horizontal plane; a data acquisition station for converting said signals of said first and said second photocell targets into forms which can be used for aligning members of said horizontal extrusion press; and a plurality of adapters for mounting said lasers and said targets on members of a horizontal metal extrusion press.

2. The alignment apparatus recited in claim 1 wherein one of said adapters is a magnetic adapter for mounting said spindle laser and said first photocell target.

3. The alignment apparatus recited in claim 1 wherein one of said adapters has a lower horizontal base portion for supporting said adapter on a pair of spaced apart skid rails of said horizontal extrusion press and an upward extending mid portion, said upward extending mid portion having upper and lower aperture for mounting a pair of spindle lasers.

4. The alignment apparatus recited in claim 1 wherein one of said adapters has a downward extending guide plate for aligning said adapter with a side edge portion of a skid rail of said extrusion press.

5. A method for aligning a horizontal metal extrusion press comprising the step of horizontally leveling a frame of said press, said step comprising: positioning a scanning photocell target at various positions on a top surface of said frame; locating a scanning laser at a fixed location on a reference plan; at each location of said scanning photocell target sweeping said scanning laser along a level horizontal plane to intersect said photocell target and generate a signal in said scanning photocell target which is indicative of the vertical position of said scanning photocell target with respect to said level horizontal plane; transmitting each of said target signals to a data acquisition station; and converting said signals into a readable form at said data acquisition station; horizontally leveling said frame by and using said signals in said readable form.

6. The method recited in claim 5 further comprising the step of aligning a master skid rail in square relationship to a rear bottle platen, said step comprising mounting said spindle laser on a front surface of said rear bottle platen; mounting said photocell target on a top surface of said master skid rail in facing relationship with said spindle laser, projecting a narrow collimated laser beam from said spindle laser to intersect said target and generate signals in said target which are indicative of the angular relationship of said bottle platen with respect to said master skid rail; transmitting said signal to said data acquisition station; and converting said signal into a readable form at said data acquisition station; aligning said master skid rail in square relationship with said rear bottle platen by using said signal in said readable form.

7. The method recited in claim 5 further comprising the step of aligning a slave skid rail in parallel relationship to a master skid rail, said step comprising: mounting said photocell target on a top surface of said slave skid rail; mounting said spindle laser on a top surface of said master skid rail; projecting a narrow collimated laser beam from said spindle laser to intersect said photocell target and generate a signal in said target which is indicative of the angular relationship of said skid rail with said master rail; transmitting said target signal to said data acquisition station; converting said signals into a readable form at said data acquisition station; and using said signal in said readable form to align said slave skid rail in parallel relationship with said master skid rail.

8. The method recited in claim 5 further comprising the step of inspecting the flatness, twist and bend of a master skid rail and a slave skid rail, said step comprising: positioning said photocell target at various positions on a top surface of said master skid rail and said slave skid rail; locating said scanning laser at a fixed location on said reference frame; for each position of said photocell target projecting a narrow collimated laser beam from said scanning laser, for each position of said photocell target sweeping said scanning laser along a level horizontal plane to intersect said photocell target and generate a signal in said photocell target which is indicative of the vertical position of said photocell target with respect to said level horizontal plane; transmitting each of said target signals to a data acquisition station; and converting said signals into a readable form at said data acquisition station; and using said signals in said readable form to inspect the flatness, twist and bend of said master skid rail and said slave skid rail.

9. The method recited in claim 5 further comprising the step of aligning a master skid rail and slave skid rail in square relationship with a rear bottle platen, said step comprising: mounting a pair of said photocell targets on a front surface of said rear bottle platen; mounting a pair of said spindle lasers in facing relationship to the photocell targets on said master skid rail and said slave skid rail; projecting a narrow collimated laser beam from each of said spindle lasers to intersect one of said targets and generate a signal in said target which is indicative of the angular relationship of said bottle platen with each of said rails; transmitting each of said target signals to said data acquisition center; converting each of said target signals into a readable form at said data acquisition center; aligning said bottle platen in square relationship with said master skid rail and said slave skid rail by using said signals in said readable form.

10. The method recited in claim 5 further comprising the step of aligning a crosshead center with a center of said extrusion press, said step comprising: mounting said spindle laser on a master rail at a position which is qualified with respect to a center of said extrusion press; mounting said photocell target on said crosshead at a position which is qualified with respect to a center of said crosshead; projecting a narrow collimated beam from said spindle laser to intersect said target and generate a signal in said target which is indicative of the position of said center of said crosshead with respect to said center of said extrusion press; transmitting said target signal to said data acquisition station; converting said target signal at said data acquisition center into a readable form; aligning said center of said crosshead with said center of said extrusion press by using said signal in said readable form.

11. The method recited in claim 5 further comprising the step of aligning a rear bottle platen in parallel relationship with a front platen, said step comprising: mounting said spindle laser on a front surface of a said rear bottle platen; mounting said photocell target on a rear surface of said front platen in facing relationship with said spindle laser; projecting a narrow collimated beam from said spindle laser to intersect said photocell target and generate a signal which is indicative of the angular relationship of said front platen with said rear bottle platen; transmitting said target signal to said data acquisition station; converting said target signal at said data acquisition station into a readable form; aligning said rear bottle platen with said front platen using said data in said readable form.

12. The method recited in claim 5 further comprising the step of aligning a center of a furnace with the center of said extrusion press, said step comprising: mounting one of said photocell targets in a forward end portion of a ram at a location which is qualified with respect to said center of said furnace; mounting one of said spindle lasers in a lower tooling hole of an inverted "T" shaped adapter, in facing rearward relationship with said photocell target; transmitting a narrow collimated laser beam from said spindle laser to intersect said target and generate a signal in said target which is indicative of the relationship of the center of said extrusion press with respect to said spindle laser; transmitting said target signal to said data acquisition station; converting said signal at said data acquisition center into a readable form; mounting a forward facing second of said spindle lasers in an upper tooling hole of said inverted "T" shaped adapter at a location which is qualified as to location with respect to said lower tooling hole; mounting a second of said photocell targets on a top surface of said furnace in rearward facing relationship to said second spindle laser at a location which is qualified with respect to said center of said furnace; transmitting a narrow collimated laser beam from said second spindle laser to intersect said second target and generate a signal in said target which is indicative of the relationship of the location of said upper tooling hole with said center of said furnace; transmitting said second target signal to said data acquisition station; converting said second target signal at said data acquisition center into a readable form; and aligning said center of said furnace with said center of said extrusion press using said signals of said data acquisition center in said readable form.

13. A method for aligning a horizontal metal extrusion press comprising the steps of: leveling a frame of said press using a scanning laser and a scanning photocell target; aligning a master skid rail in square relationship with a rear bottle platen using a spindle laser and a photocell target; aligning a slave skid rail in parallel relationship to a master skid rail using said spindle laser and said spindle laser photocell target; aligning said master skid rail and said slave skid rail in square relationship with said rear bottle platen using said spindle laser and said spindle laser target; aligning a crosshead center with a center of said extrusion press using said spindle laser and said spindle laser target; aligning a rear bottle platen in parallel relationship with a front platen using said spindle laser and said spindle laser target; and aligning a center of a furnace with the center of said extrusion press using a pair of said spindle lasers and a pair of said spindle laser targets.

14. The method recited in claim 13 further comprising the step of inspecting the flatness, twist and bend of a master skid rail and a slave skid rail using said scanning laser and said scanning photocell target.

15. The method recited in claim 13 wherein said step of aligning said bottle platen in square relationship with said skid rails is performed with an operating load applied to said press.

16. The method recited in claim 13 wherein said steps are performed with said extrusion press under an operating load.

* * * * *